UNITED STATES PATENT OFFICE.

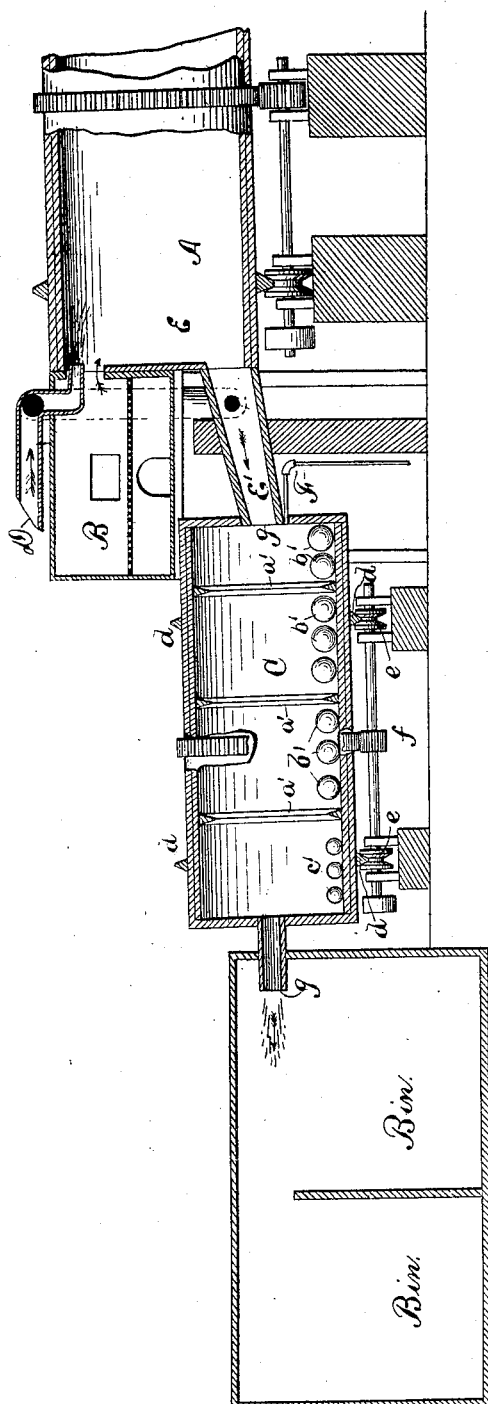

GEORGE DURYEE, OF ORANGE, NEW JERSEY.

APPARATUS FOR BURNING AND GRINDING LIME AND CEMENT.

SPECIFICATION forming part of Letters Patent No. 611,110, dated September 20, 1898.

Application filed August 22, 1896. Serial No. 603,592. (No model.)

*To all whom it may concern:*

Be it known that I, GEORGE DURYEE, a citizen of the United States, residing at Orange, in the county of Essex and State of New Jersey, have invented certain new and useful Improvements in Apparatus for Burning and Grinding Lime and Cement Clinker, of which the following is a clear, full, and exact specification.

This invention relates to an improved apparatus for the simultaneous burning and grinding of lime and cement clinker, and particularly to the curing of Portland cement.

In the manufacture of Portland cement, either from clay or lime mixtures or from the natural "cement-rock," so called, where the silica, alumina, and lime are combined naturally, it is well known that free lime in the burned clinker, in the form of unburned lime or partially-combined lime, acts on the powdered cement seriously, often causing disintegration of the concrete or mason work. To obviate this, it is essential to air the cement from one to three months in open bins, or "cure" the cement, as it is called, to prevent slaking in the concrete-work.

I have found that if hot cement-clinker direct from the burning-furnace is powdered while hot and dry or moist air injected into the mass while being ground the free lime is slaked at once, accomplishing in one hour what has heretofore required one to three months. I have further learned that the red-hot soft friable clinker is powdered with about half the power or double the speed that the same clinker requires after cooling and becoming vitreous. As this hot clinker cools quickly, it requires continuous feeding directly from the furnace where produced into the grinding-cylinder of such a furnace, for instance, as described in United States Letters Patent Nos. 236,561 and 236,562, granted to me on January 11, 1881, and No. 430,929, granted to me on June 24, 1890.

The carrying out of the invention will be described with reference to the accompanying drawing, which shows in vertical central section an apparatus suitable for carrying out my invention.

A represents the lower end of a rotary burning-cylinder.

B is an elevated fuel-furnace or combustion-chamber; C, the rotary grinding-cylinder; D, the hot-blast devices, located at the adjacent upper portions of the fuel-furnace and rotary burning-cylinder; E, the hot-air pipe from the hot-blast devices, entering the pipe E', connecting the burning-cylinder with the grinding-cylinder, and F a water or steam pipe for supplying moisture to the rotary grinding-cylinder.

$a'$ represents dams in the lining of the grinding-cylinder. $b'$ represents large balls, and $c'$ smaller balls, in said grinding-cylinder.

The cylinder C is preferably twenty feet long by five feet in diameter, constructed of half-inch steel plates, lined with very hard vitrified brick or other suitable lining to stand heavy friction and wear from the clinker and grinding-balls, and is mounted horizontally or slightly inclined by heavy tires $d$, resting on grooved rolls $e$, revolved by gearing $f$. An opening $g$ of about fifteen inches diameter is left in each end of the rotary grinding-cylinder for the feeding in at the upper end and discharge of ground cement at the lower end. The cylinder ends are made strong by heavy plates of iron, and the whole inside is lined with the brick six or eight inches thick. One or more basins are formed by the projecting partitions of the lining. These basins are about sixteen inches deep and are partly filled with grinding-balls two to four inches in diameter, or preferably flint balls, two or four tons to be used, according to the size of the cylinder. Speed in grinding, about twenty-five revolutions per minute. Thus it will be seen that the grinding-cylinder is provided on its interior with a series of basins in which balls are arranged for the purpose of crushing the hot and soft clinker, relatively heavy balls being in the basin nearest to the burning-cylinder and successively lighter balls in the following basins. This grinding-cylinder is so placed in such a position regarding the rotary burning-cylinder as to allow of continuous and direct feed of clinker from rotary burning-cylinder to grinding-cylinder.

F is an air or steam pipe for discharging the contents of the grinding-cylinder and conveying moisture thereto.

The relative positions of the rotary burning-cylinder and the rotary grinding-cylinder are shown in the drawing attached hereto.

Manner of working: The grinding-cylinder is to be first filled with clinker to prevent the balls injuring the lining. When the hot clinker begins to come from the rotary burning-cylinder and enters the grinding-cylinder, the grinding-cylinder is set in motion and the air or steam pipe F opened to force the powdered cement out after doing the slaking. After starting and the process of grinding begins the only precaution necessary is to keep up proper feed of clinker, air, or moisture, and the process works continuously, blowing the cement out of the grinding-cylinder into bins or other receptacles.

For precaution against large-sized clinker the upper basin should have large balls weighing from ten to twenty pounds each. These large lumps of clinker contain more free lime than the small vitrified clinker of wheat size. Hence when the clinker runs large more air and moisture will be required.

The curing is hastened by a hot-air blast. Hence the hot-air blast passing through the hot-blast devices will for some clinkers be found essential, while clinkers from natural rock require moisture. The experience of the operator and analysis for free lime in the cement will determine the proceeding to be adopted. For instance, vitrified fuel-clinker containing but little free lime is easily treated by this apparatus.

Having thus described my invention, the following is what I claim as new therein and desire to secure by Letters Patent:

1. An apparatus for burning and grinding lime and cement clinker, comprising a rotary burning-cylinder, a rotary grinding-cylinder in line with the burning-cylinder, a connection by which the cylinders have direct communication, a pipe connecting with the grinding-cylinder for injecting moisture thereinto, an elevated fuel-furnace mounted over the inlet end of the grinding-cylinder, at the discharge end of the burning-cylinder, and having an opening into the latter, and a hot-air-blast pipe extending through the crown of the fuel-furnace and through the opening thereof and discharging directly into the burning-cylinder; substantially as described.

2. The combination of a rotary burning-cylinder, an elevated fuel-furnace, a communication between said burning-cylinder and furnace, air-blast devices located at the adjacent portions of the burning-cylinder and furnace, a rotary grinding-cylinder, a connecting-pipe between the cylinders, a hot-air pipe connecting the blast devices with the connecting-pipe, and a pipe connected with the grinding-cylinder to inject moisture into the latter, substantially as set forth.

3. The combination of a rotary burning-cylinder, an elevated combustion-chamber or fuel-furnace, a communication between said burning-cylinder and furnace, blast devices located at the adjacent upper portions of the burning-cylinder and furnace, a hot-air pipe connected with the blast devices and discharging at the outlet to the burning-cylinder, a rotary grinding-cylinder provided with a series of basins on its interior, having balls therein so arranged as to crush the hot and soft clinker, relatively heavy balls being located in the basin nearest the burning-cylinder and successively lighter balls in the following basins, a connection between the cylinders, a receiving-bin, and means for discharging the ground cement into the bin; substantially as described.

4. The combination of a rotary burning-cylinder, an elevated combustion-chamber or fuel-furnace, a communication between said burning-cylinder and furnace, blast devices located at the adjacent upper portions of the burning-cylinder and furnace, a hot-air pipe connected with the blast devices and discharging at the outlet to the burning-cylinder, a rotary grinding-cylinder provided with a series of basins on its interior, having balls arranged therein so as to crush the hot and soft clinker, relatively heavy balls being located in the basin nearest the burning-cylinder and successively lighter balls in the following basins, a connection between the cylinders, a receiving-bin, and connections for blowing the ground cement into the bin; substantially as described.

GEORGE DURYEE.

Witnesses:
GEORGE W. DURYEE,
WM. H. BORCHERDING.